United States Patent
Lin et al.

(10) Patent No.: US 7,181,434 B2
(45) Date of Patent: Feb. 20, 2007

(54) METHOD FOR CONVERTING HIGH LEVEL MOTION SCRIPTS TO COMPUTER ANIMATIONS

(75) Inventors: Tsang-Gang Lin, Hsinchu (TW);
Chia-Chen Chen, Hsinchu (TW);
Shi-Nine Yang, Hsinchu (TW);
Shih-Pin Chao, Hsinchu (TW);
Chih-Yi Chiu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 516 days.

(21) Appl. No.: 10/727,590

(22) Filed: Dec. 5, 2003

(65) Prior Publication Data
US 2004/0246255 A1    Dec. 9, 2004

(30) Foreign Application Priority Data
Jun. 6, 2003    (TW) ................. 92115392 A

(51) Int. Cl.
*G06E 1/00* (2006.01)
*G06E 6/00* (2006.01)
*G06F 15/18* (2006.01)
*G06G 1/00* (2006.01)
*G06N 3/02* (2006.01)

(52) U.S. Cl. ........................................ 706/15
(58) Field of Classification Search ............ 706/55
See application file for complete search history.

(56) References Cited

U.S. PATENT DOCUMENTS

| | | | | |
|---|---|---|---|---|
| 4,600,919 A | * | 7/1986 | Stern | 345/473 |
| 4,884,972 A | * | 12/1989 | Gasper | 434/185 |
| 5,261,041 A | * | 11/1993 | Susman | 345/473 |
| 5,493,677 A | * | 2/1996 | Balogh et al. | 707/104.1 |
| 5,867,175 A | * | 2/1999 | Katzenberger et al. | 345/473 |
| 5,895,464 A | * | 4/1999 | Bhandari et al. | 707/3 |
| 6,329,994 B1 | * | 12/2001 | Gever et al. | 345/473 |
| 6,535,215 B1 | * | 3/2003 | DeWitt et al. | 345/473 |
| 6,549,887 B1 | * | 4/2003 | Ando et al. | 704/271 |
| 2003/0170002 A1 | * | 9/2003 | Mory | 386/52 |

OTHER PUBLICATIONS

L.Zhao, M.Costa, and N.Badler, "Interpreting movement manner", In Proc. Computer Animation Conf., pp. 98-103, Philadelphia, PA, May 2000.*
AB Benitez et al., "Object-based multimedia content description schemes and applications for MPEG-7", pp. 1-35, Signal Processing: Image Communication, 2000.*
R Elliott, JRW Glauert, JR Kennaway, I Marshall, "The development of language processing support for the ViSiCAST project", pp. 101-108, Proceedings of the fourth international ACM conference on Assistive technologies, 2000.*
Norman I. Badler, "Artificial Intelligence, Natural Language, and Simulation for Human Animation", Computer Animation. Proceedings of Computer Animation 89, Geneva, Switzerland, Jun. 22-23, 1989, pp. 19-31.*
R. Bindiganavale et al., "Dynamically altering agent behaviors using natural language instructions", pp. 293-300, Proceedings of the fourth international conference on Autonomous agents, 2000.*

* cited by examiner

*Primary Examiner*—Anthony Knight
*Assistant Examiner*—Michael B. Holmes
(74) *Attorney, Agent, or Firm*—Birch, Stewart, Kolasch & Birch, LLP

(57) ABSTRACT

A method that converts high-level scripts into 3D animations uses natural language for fast prototyping. The proposed method first transforms the natural language script into the metadata with high-level semantics, then matches the metadata to several motion clips in the motion databases, and finally, synthesizes these motion clips into a 3D animation.

10 Claims, 4 Drawing Sheets

METHOD FOR CONVERTING HIGH LEVEL MOTION SCRIPTS TO COMPUTER ANIMATIONS

This Nonprovisional application claims priority under 35 U.S.C. § 119(a) on Patent Application No(s). 092115392 filed in TAIWAN on Jun. 6, 2003, the entire contents of which are hereby incorporated by reference.

BACKGROUND OF THE INVENTION

1. Field of Invention

The invention is related to a 3D (standing for three-dimensional) animation generation method used in digital multimedia, especially related to a 3D animation generation method using high-level motion scripts.

2. Related Art

In recent years, the application areas of computers have been broadened by their increasing computation power. With the advance of digital multimedia techniques, mass media also use computers to produce and deliver contents. In addition, recreation companies have already employed computer-based techniques to create animations and synthesize virtual characters in computer games. How to generate vivid and controllable character animations becomes an important issue in the areas of computer animation and video games.

In the traditional animation production, the motions of each character are drawn frame by frame by animators. Even for keyframes, describing a pose requires setting the angles of all joints, and hence requires setting about 20 to 60 parameters for each frame. As a result, it is difficult to animate and control virtual characters on the fly. Besides, the keyframe method heavily relies on animators' skills and experiences to produce vivid human animations. Another approach is known as the kinematics-based animation production method. When creating human animations, the method calculates the translation and rotation parameters of the end-effectors, the angles of joints, centers of gravity and roots by using techniques of biomechanics to generate vivid animations. Due to the high complexity of human motions, it is difficult to find good approximate motion equations. Hence, the application of this method is restricted, and is usually used in the syntheses of locomotion animations.

Dynamics is another method for simulating and generating motions by formulating the mass, inertia and angular moment of objects. However, simulating complicated joint systems such as human beings consumes a lot of computation power. Hence, it is difficult to generate animations by real-time dynamic simulation. The latest method employs 3D motion sensors to capture human motions. Since the captured motion data are guaranteed to fulfill the constraints in dynamics, the captured motion data are more vivid than those obtained by the prior methods. However, motion capture equipments are expensive and both capture and data editing processes are time-consuming. To reduce these costs, the reuse of the captured motion data becomes an important research issue. Recently, motion graphs and motion texture proposed novel control mechanisms to synthesize a new motion based on the existing motion data. However, these approaches still remain some difficulties such as long pre-processing time, and unexpected transitions. Moreover, the connection between high-level motion control and low-level mathematical models developed by these systems is unclear.

SUMMARY OF THE INVENTION

To solve the mentioned problems, the invention proposes a 3D animation generation method, which enables users to synthesize 3D animations by inputting natural language scripts.

The invention is related to a 3D animation generation method using scripts to automatically synthesize 3D animations by natural language analysis techniques and the motion index tables. In essence, the proposed method is able to generate various 3D animations by using an annotated human motion database and the natural language analysis techniques. The proposed method first analyzes the motion-related terms and knowledge in natural language processing, and builds their ontology. Then, the ontology is transformed into semantic metadata to enable computers to understand the semantics of natural language. Finally, the required motion clips are retrieved from the motion database, and are synthesized into a 3D animation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
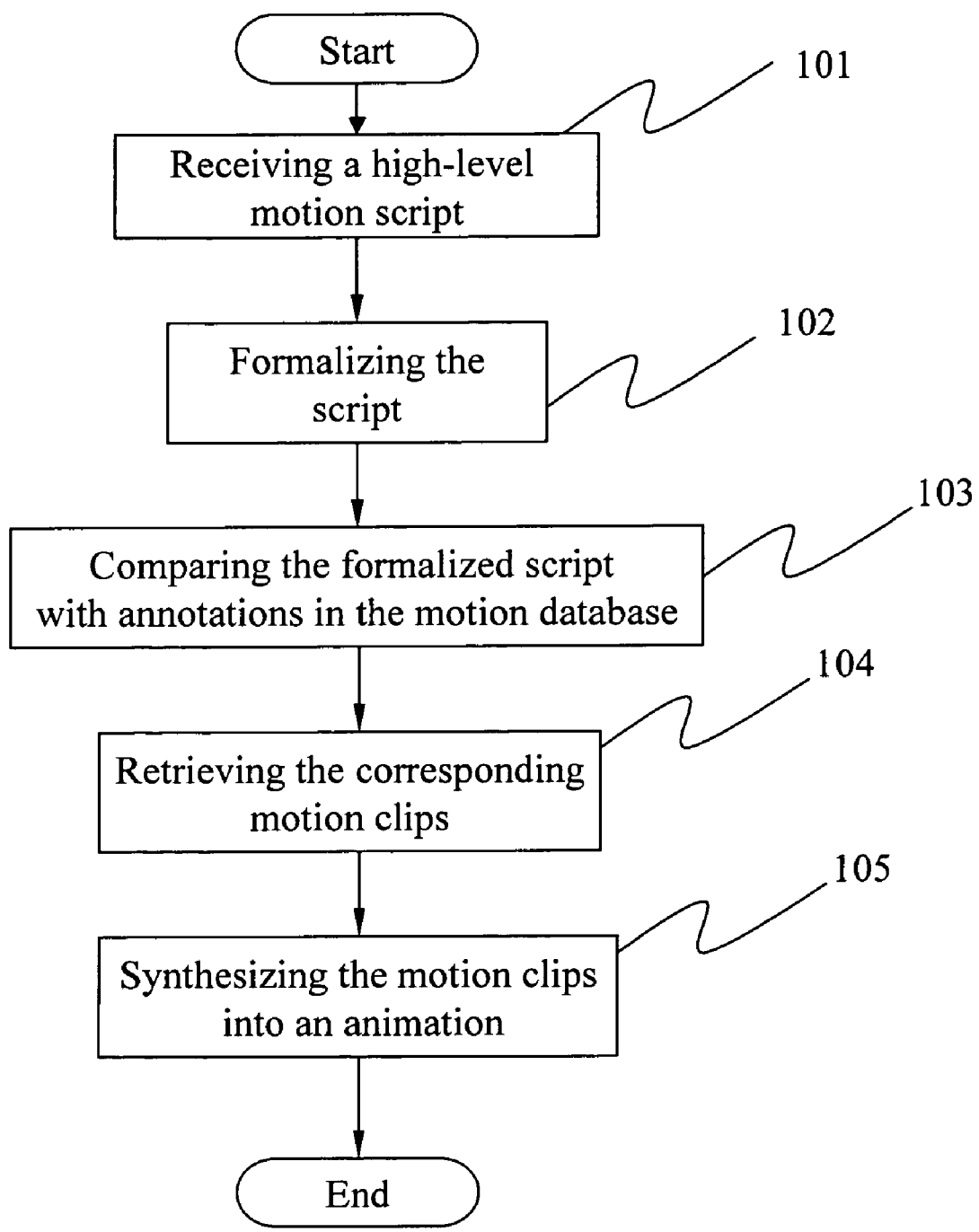
FIG. 1 shows the control flow of the proposed method.

The invention proposes a 3D animation conversion method using scripts. FIG. 1 shows the control flow of the proposed method. After receiving a user-inputted high-level motion script (Step 101), the method first formalizes the script into a computer-recognizable formation (Step 102), then compares the formalized script with the annotation in the motion database (Step 103), retrieves the corresponding motion clips (Step 104), and finally, synthesizes these motion clips into a 3D animation (Step 105).

Figure 2:
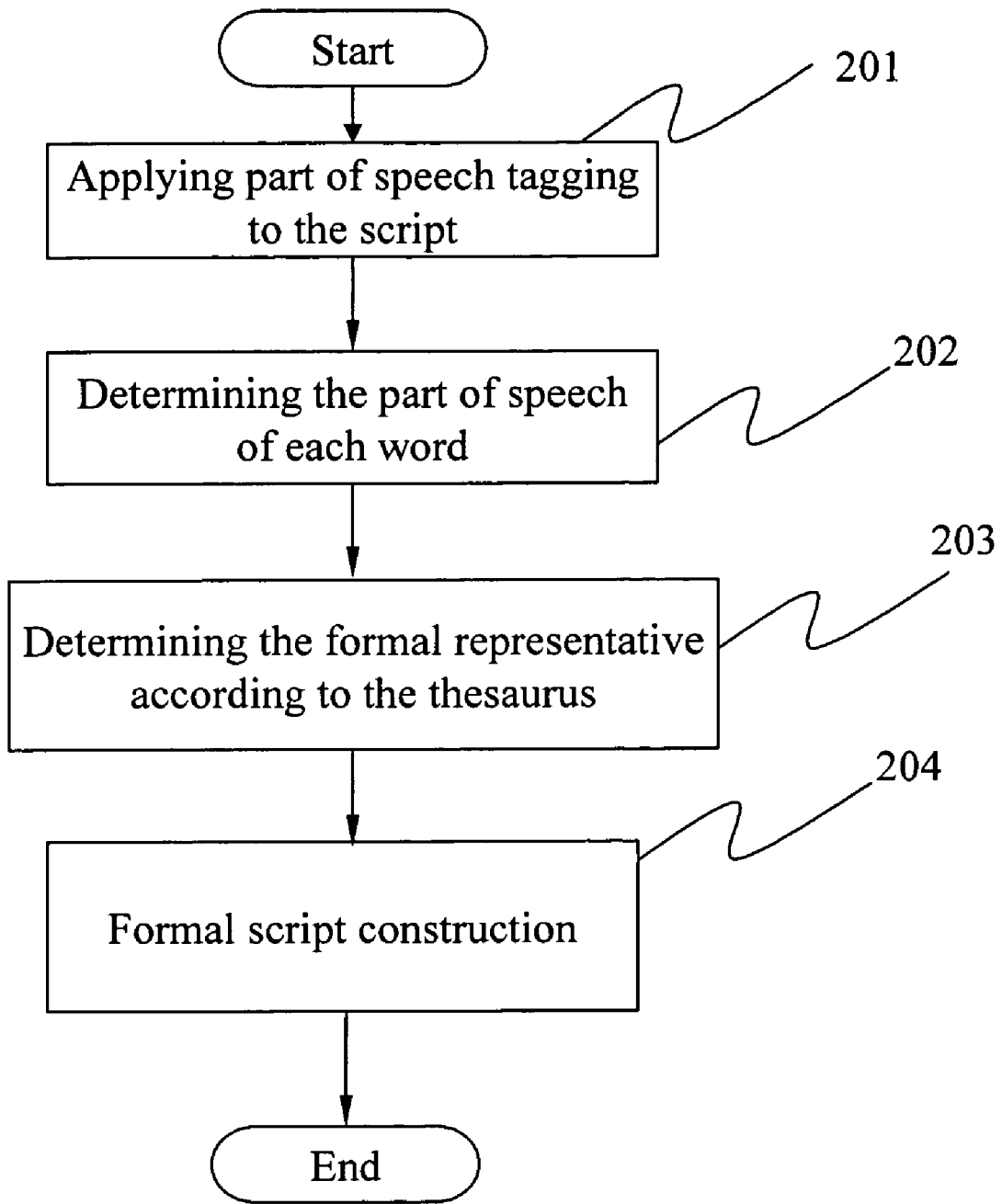
FIG. 2 shows the control flow of the proposed natural language formalization method.

Formalizing natural language into a computer-recognizable formation is the foundation of the proposed method. Hence, we take thesauruses and metadata to perform formalization. FIG. 2 shows the control flow of the formalization of natural language. First, we apply part of speech tagging to the natural language script (Step 201). Then, the part of speech (Step 202) and the corresponding formal representative of each word are recognized (Step 203). Accordingly, we form the formal script according to formal constructs (Step 204). Since the script is composed of natural language terms, transforming the script from natural language into the formal language relies on the thesauruses, which are used to keep the consistency of metadata and to store the mapping of the terms with similar meanings in the specific domain. Since natural language is not annotated by any semantic metadata, computers cannot understand the high level semantics of the natural language in the digital content. Hence, metadata annotation is used to enable computers to understand the implicit semantics of the digital content. However, metadata must be well formed. This criterion enables users to annotate the semantics of digital content under some guidelines, and enables computers with limited ontology and inference rules to understand human's thoughts and creativity.

Take a human body animation as an example. Since human motions can be expressed by specific terms, the thesauruses are established to generate the mapping of metadata. First, human motions related documents are collected and analyzed by natural language processing tools (also known as natural language parsers) to tag the part of speech of each word in the documents (e.g., noun, verb, preposition . . . ). According to the statistics of these tags, keywords are extracted and thesauruses are built. Then, we use thesauruses to map the synonyms of these keywords into formal representatives. For example, "move downward" is used as the formal representative of "downward", "move down" and "go down". Accordingly, the motion data can be annotated by metadata. Metadata can be expressed in XML (standing for Extensible Markup Language) format to obtain portability and generality.

Figure 3:
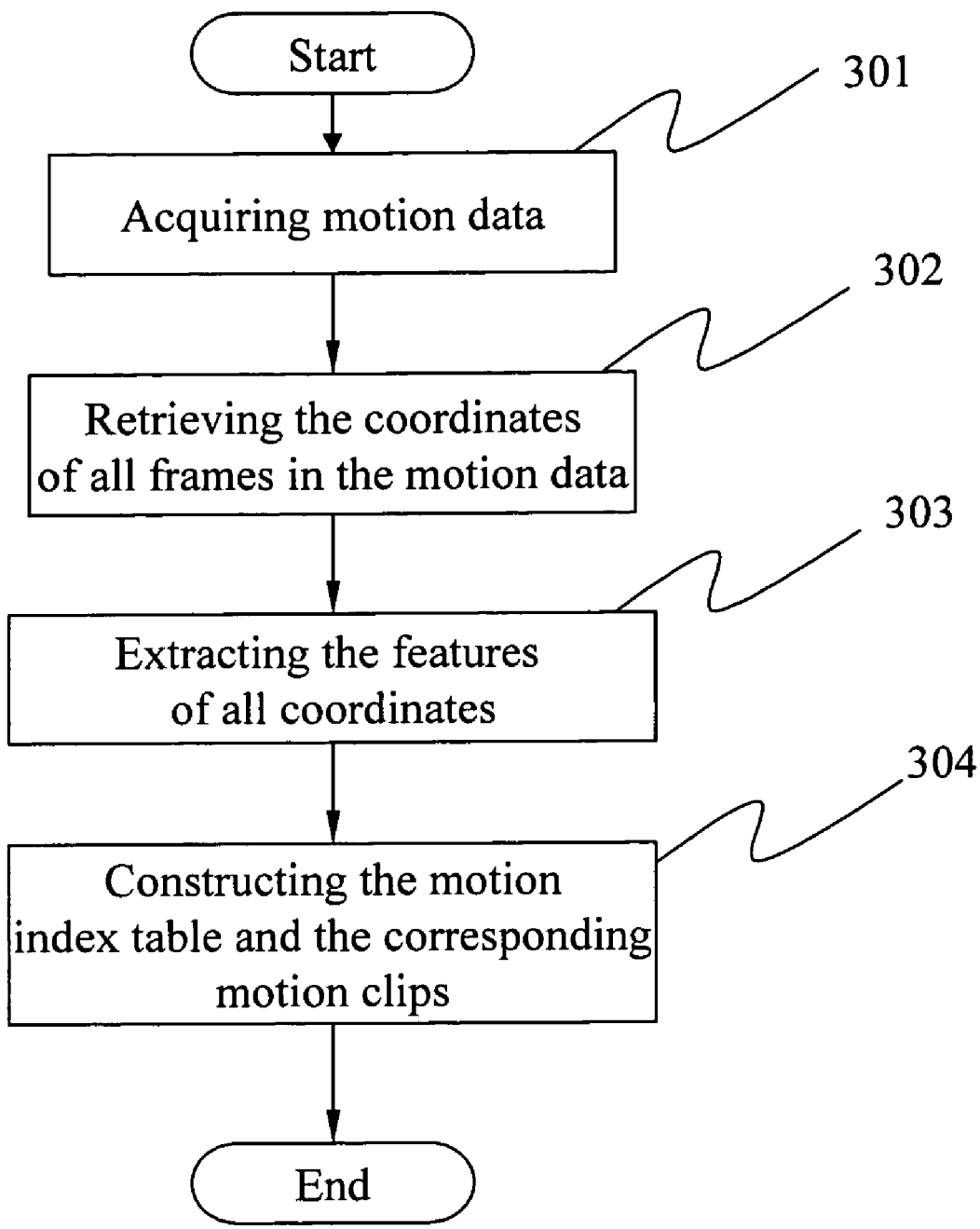
FIG. 3 shows the control flow of the establishment of a motion database.

After formalization, a formalized script is formed and used to compare with the annotations, which are also formalized scripts, in the motion database to retrieve the corresponding motion clips to synthesize a 3D animation. The motion database comprises several motion clips and motion index tables. The corresponding motion clips can be retrieved by using the motion index table and comparing the metadata of corresponding motion clips. FIG. 3 shows the control flow of the establishment of the motion database. First, the motion data are read (Step 301). Then, the coordinates of each frame in a motion data are extracted (Step 302) and the coordinate features are calculated (Step 303). The motion clips and the corresponding index table are established according to the coordinate features (Step 304). In the motion capture data, each frame records the 3D Cartesian coordinate of each joint and the root orientation. Take the human motion as an example. In each frame, we first extract the poses of the limbs (i.e., left arm, right arm, left foot and right foot). An arm comprises an upper arm and a forearm, and a foot comprises a thigh and a calf. In order to reduce the number of dimensionality and to be affine invariant during body movement, the representation of the limb is transformed from their 3D Cartesian coordinates to 2D spherical coordinates. Let v be a limb vector and r be equivalent to the root orientation vector. Suppose $\pi$ is the plane passing through the joint o and parallel to the floor. Let the projection of v and r on $\pi$ be the $v_{xz}$ and $r_{xz}$ respectively. Then $\theta$ and $\phi$, the spherical coordinates of v on $\pi$, are measured in angular radians from $v_{xz}$ to $r_{xz}$ and from v to Y axis respectively. In this case, Y axis is the normal vector of $\pi$.

An arm posture is represented as 4D tuples $(\theta,\phi,\hat{\theta},\hat{\phi})$, where $(\theta,\phi)$ and $(\hat{\theta},\hat{\phi})$ are extracted from the upper arm and the forearm, respectively. We also use the same steps to extract the features of a foot.

Figure 4:
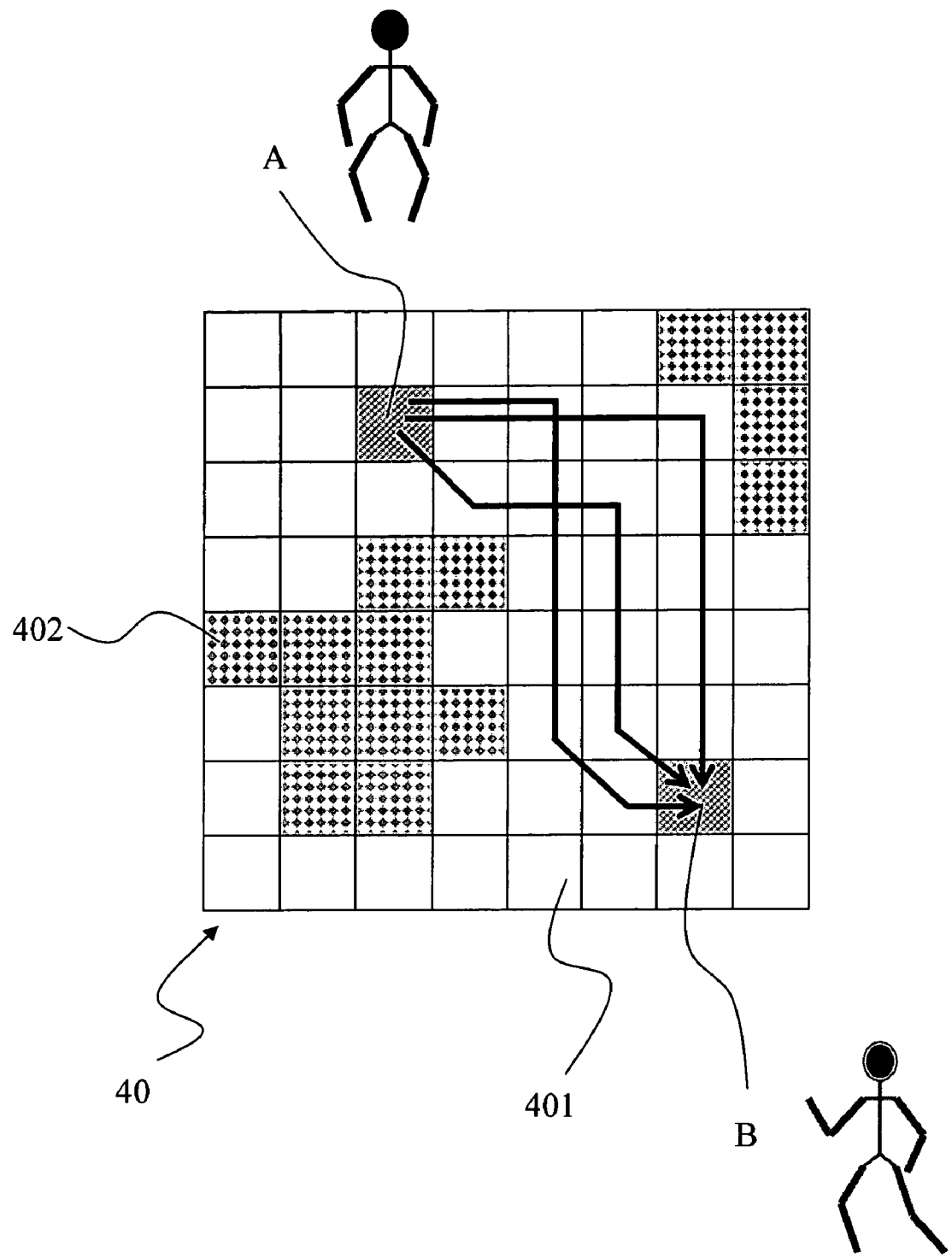
FIG. 4 shows the control flow of the proposed motion clip search method.

As shown in FIG. 4, a motion index table is a direct sum of two four-dimensional index tables (the poses of the left and right arms) and an eight-dimensional index table (the poses of both feet). For each motion frame, we quantize its posture features to form its index. For example, $(\theta,\phi,\hat{\theta},\hat{\phi})$ are the posture features of the left arm in the i-th frame, then its index can be computed using the following truncation function H, $$H(\theta_i, \varphi_i, \hat{\theta}_i, \hat{\varphi}_i) = \left( \left\lfloor \frac{\theta_i}{a} \right\rfloor, \left\lfloor \frac{\varphi_i}{b} \right\rfloor, \left\lfloor \frac{\hat{\theta}_i}{c} \right\rfloor, \left\lfloor \frac{\hat{\varphi}_i}{d} \right\rfloor \right),$$

where a, b, c, d are the step sizes of angle radians and the operator $\lfloor \ \rfloor$ denotes the floor function. A set of successive frames will be indexed into the same cell by the above equation as long as they are with the same truncated posture features. Hence, the successive motion captured data will be partitioned into several consecutive cells, and each cell may contain several motion clips. The numbers of the starting and ending frames in each motion clip are also stored in the corresponding cell.

The motion index table can be established when all motion data have been partitioned well. As shown in FIG. 4, the motion index table 40 contains multiple cells, which comprise several cells with data 401 and several cells without data 402. The more motion data there are, the less the number of cells without data is, and the less the restriction of generating animation is. In addition, the metadata of motion annotations have to be consistent with the indexed motion data. The hierarchical MPEG-7 DDL (standing for description definition language) format is then used to annotate the motion features and the semantics of the static and dynamic motions. A normal form similarity matching mechanism is applied to approximate the best matching between the formalized input script and the annotation of the motion database. The continuous DTW (standing for dynamic time warping) algorithm is employed. The corresponding cells of the pose and the corresponding cell connection path of the motion can be obtained according to the similarity of the metadata. Finally, the information of the starting and ending frames can be obtained from the metadata of the pose and the motion.

FIG. 4 shows the steps from pose indexing to motion synthesis. Pose indexing is to find the cells of the starting frame A and ending frame B. Suppose that the starting and ending frames are $f_{start}$ and $f_{end}$, respectively, and the corresponding cells are $C_{start}$ and $C_{end}$, respectively. Path searching is to find the possible paths from $C_{start}$ to $C_{end}$. For example, there are three possible paths in FIG. 4. The path is determined by an algorithm which uses a threshold $\alpha$ to restrict the search space, and adjusts the weights according to the numbers of motion clips in a cell. This algorithm repeats until a path from $C_{start}$ and $C_{end}$ is discovered. After the assignment of all key poses, the system retrieves the corresponding motion capture data according to the motion index table, and obtains the connection paths of key poses by visiting neighbor cells with a greedy algorithm. The motion transitions among neighbors should not only consider the root orientation and the alignments of the motion directions, but also solve the feet sliding, penetrating, suspending on the floor, and other phenomena violating environmental constraints.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What is claimed is:

1. A 3D animation conversion method using scripts, comprising:

receiving a natural language script;

formalizing the script;

comparing the script with a motion database comprising multiple motion clips and a motion index table which is used to obtain the motion clips corresponding to the script;

retrieving the corresponding motion clips; and synthesizing a 3D animation according to the retrieved motion clips, wherein the step of synthesizing a 3D animation further comprises:

indexing cells which contain the starting clips and the ending clips, respectively;

searching possible paths from staring and ending cells; and synthesizing all the clips along the selected path in the index table.

2. The method of claim 1, wherein the step of formalizing the script comprises:

tagging the script into multiple words;

determining the part of speech of each tag;

determining the idiom of each tag according to the thesaurus; and transforming the idiom into a formal language.

3. The method of claim 2, wherein the idiom is the most popular one among all synonyms of the tag.

4. The method of claim 2, wherein the formal language is in the XML format.

5. The method of claim 1, wherein the step of constructing the motion database comprises:

receiving motion data;

retrieving the coordinates of each frame;

extracting the features of coordinates in each frame; and constructing the index table of the motion data and the corresponding motion clips and motion annotations.

6. The method of claim 5, wherein the motion clip comprises multiple frames.

7. The method of claim 6, wherein the motion annotation is in the MPEG-7 DDL format.

8. The method of claim 6, wherein the motion clip is obtained by partitioning the motion data according to semantics.

9. The method of claim 5, wherein the features of a frame are the coordinates of the frame projected to a polar coordinate system.

10. The method of claim 1, wherein the path searching is performed by a weighted greedy algorithm.

* * * * *